United States Patent [19]

Wehrle et al.

[11] Patent Number: 5,042,890
[45] Date of Patent: Aug. 27, 1991

[54] DEVICE FOR THE COUPLING OF LASERS, DIODES OR THE LIKE BY MEANS OF LIGHT-CONDUCTING FIBERS OR SUCH TYPES OF FIBERS WITH ONE ANOTHER

[75] Inventors: Klaus Wehrle, Brigachtal; Bernd Jakober, VS-Mühlhausen, both of Fed. Rep. of Germany

[73] Assignee: Hommelwerke, GmbH, Fed. Rep. of Germany

[21] Appl. No.: 483,867

[22] Filed: Feb. 23, 1990

[30] Foreign Application Priority Data

Sep. 8, 1989 [DE] Fed. Rep. of Germany ....... 3929944

[51] Int. Cl.⁵ .................................. G02B 6/42
[52] U.S. Cl. .......................................... 385/90; 385/55
[58] Field of Search .................. 350/96.2, 96.21, 96.22

[56] References Cited

U.S. PATENT DOCUMENTS 4,272,154 1/1981 Bachel ............................. 350/96.22
4,380,349 4/1983 Bray ............................... 350/96.2 X
4,427,879 1/1984 Becher et al. ................... 350/96.2 X
4,762,388 8/1988 Tanaka et al. ..................... 350/96.2

Primary Examiner—John D. Lee
Assistant Examiner—John Ngo
Attorney, Agent, or Firm—Allegretti & Witcoff, Ltd.

[57] ABSTRACT

A device for the coupling of lasers, diodes or the like with one another or with light-conductive fibers or of such fibers with one another, having two support bodies for the holding of a laser, of a diode or of one fiber in the directio of one optical axis. Between the two support bodies, there is positioned an intermediary body which is guided, with one of the two support bodies, in the direction of the optical axis and connected in a displaceable manner by means of sliding surfaces. The contact surfaces extend perpendicularly to the optical axis. By means of the contact surfaces, a precise rotational adjustment of the support bodies is possible. Fluid adhesive material can be placed between the contact surfaces by means of the capillary effect, and thus a very precise fixing of the support bodies and intermediary body, and thus of the optical parts to one another, can thereby be attained.

10 Claims, 4 Drawing Sheets

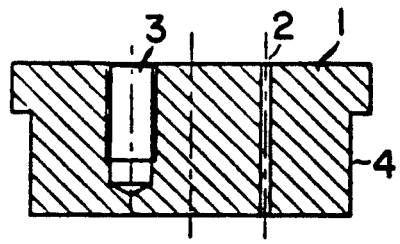
FIG.1
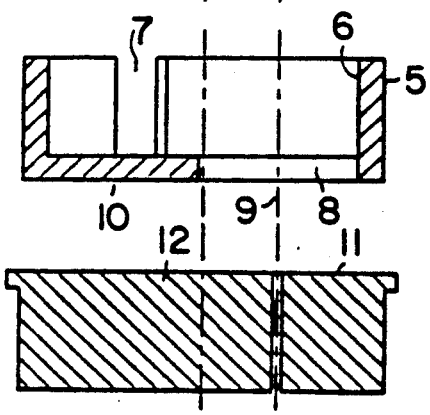
FIG.2
FIG.3
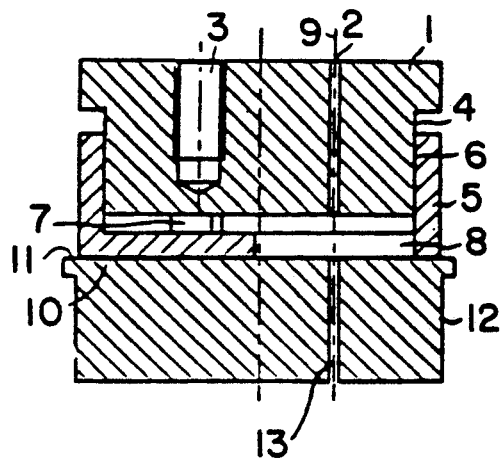
FIG.4

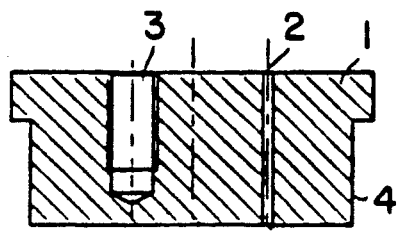
FIG.5
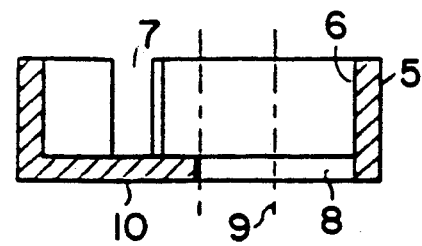
FIG.6
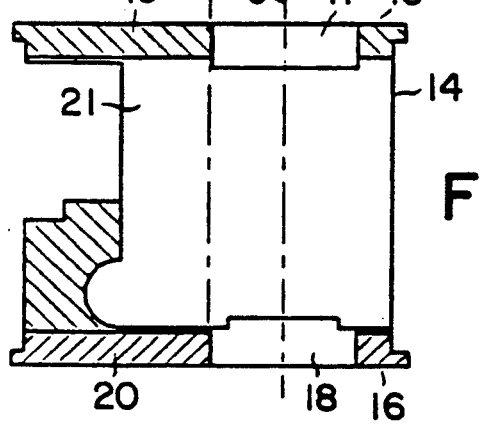
FIG.7
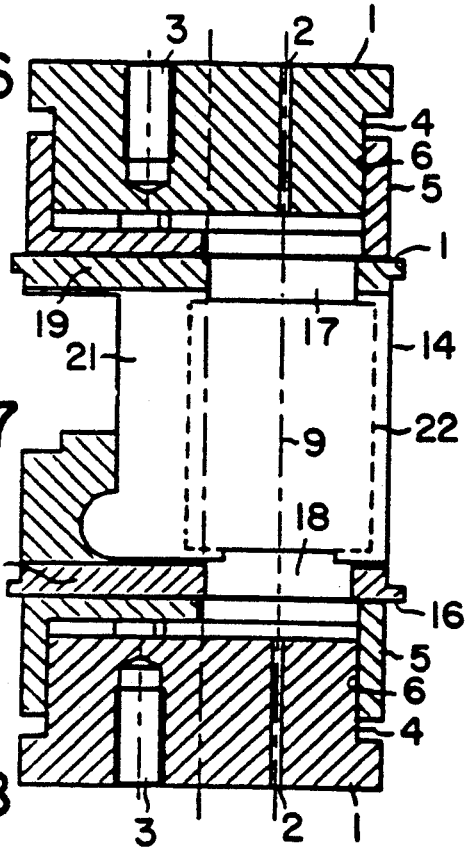
FIG.10
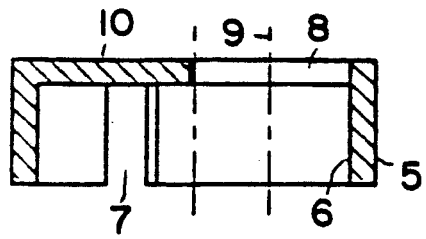
FIG.8
FIG.9

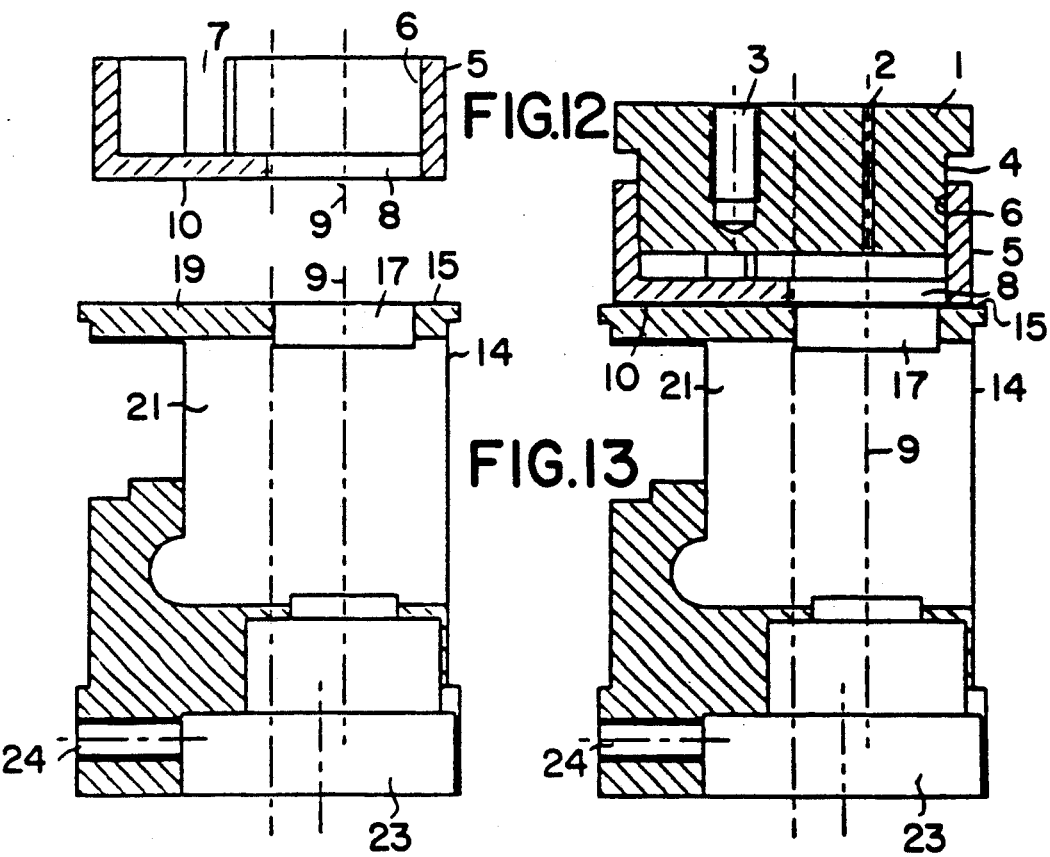

DEVICE FOR THE COUPLING OF LASERS, DIODES OR THE LIKE BY MEANS OF LIGHT-CONDUCTING FIBERS OR SUCH TYPES OF FIBERS WITH ONE ANOTHER

BACKGROUND OF THE INVENTION

The invention relates to a device of the type for the coupling of lasers, diodes or the like with light-conducting fibers or of such fibers with on another.

Various arrangements are known for guiding the laser beam of a semiconductor laser into a monomode light wave guide. One arrangement consists of coupling a tapered end of a fiber with a lens soldered on directly with a laser diode. A second known device consists of coupling a fiber with the laser diode by means of a gradient lens (GRIN) and a spherical lens. Finally, one further arrangement consists of coupling the end of the fiber with the laser diode, by means of a connecting optical unit having two spherical lenses.

All of these devices have the disadvantage that they are difficult to adjust, since the active diameter of single-mode fibers is less than 10 pm. If the adjustment tolerances are still smaller, then the difficulties of adjustment increase correspondingly.

Adjustment apparatuses with mechanically redundant screw connection of the type as known per se are, in the submicrometer range, difficult to handle, and are furthermore too bulky for micro-technical applications. It is also known to adhere semi-conductor lasers and planar wave guides directly. Because of contractions during the hardening, the precise adjustments are lost again. Low-contraction adhesives have high proportions of filling materials, are thus very viscous, and are therefore scarcely suited for binding small parts in the form of laser diodes, fibers and the like by means of adhesives, without disadvantages for the adjustment. Also, adhesive materials which polymerize under UV light, which can be applied before the adjustment, do not meet the very high demands placed as regards to the rigidity of the adhesive connection.

The task forming the basis of the invention is that of creating a device of the type concerned for the coupling of lasers, diodes or the like with light-conducting fibers, or of such fibers with one another, which makes possible an adjustment of the coupling with high precision, as well as a fixation by means of adhesive materials without having an influence on the adjustment.

The task which forms the basis of the invention is solved by means of the theory stated in the characterizing portion of claim 1.

The basic concept of the theory in accordance with the invention is that of creating precise sliding surfaces for the guide device both in the direction of the optical axis as well as in all directions perpendicular thereto as well, which, during corresponding fitting to one another, make possible not only a simple adjustment, but also maintain the selected adjustment position on the basis of friction forces between the contact surfaces, if the parts are connected with one another by means of adhesive materials after the adjustment. If a sufficiently water adhesive material is used, then, because of the capillary effect, the adhesive flows into the very narrow intermediary space between the surfaces fitting with one another, and is optimally distributed there. If adhesive material which hardens very rapidly is used, then the fixation of the adjustment point is achieved in only a few seconds.

The adjustment can naturally be carried out with the help of auxiliary devices which maintain the adjustment position for at least a short time. After the application of the adhesive material, the adjustment position is then fixed. The support parts holding the optical elements, such as laser, diode, fibers or the like, can thus be extremely small, and are suited for an automatic adjustment, and the fixing is also extremely sturdy. The optical elements which are to be coupled with one another can essentially be of any type desired. The device in accordance with the invention is always suitable in such a place where such optical elements have to be oriented, adjusted and fixed in the direction of one optical axis and in all directions perpendicular thereto.

According to the theory of claim 2, the sliding surfaces which form the axial guide device are partially cylindrical, and they thus form a telescope-like guide device. One such embodiment can be produced in a particularly simple and precise manufacturing process. In this, the question of which part the internal surfaces and the external surfaces are located on is entirely a matter of choice. It is suitable, however, that the sliding surface on the one support body is an external surface, and the sliding surface on the intermediary body is an internal surface. In order to provide accessibility to the contact area between the sliding surfaces, for the purpose of applying adhesive materials, it is suitable to provide, within the externally-positioned part, at least one opening up to the boundary surface.

The support body can have, for the mounting support of a light-conducting fiber, a boring or hole into which this fiber is inserted and then fixed in an entirely simple manner.

In accordance with one particularly suitable further development in accordance with claim 7, the support body for a laser has, in the direction of the optical axis, a hollow space in front of the laser for the mounting of optical elements, particularly of an interfermeter. Suitable in this connection is one further development of this embodiment, in accordance with which a second intermediary body is provided, which is coordinated with the other intermediary body and, in the same manner as the intermediary body coordinated with the first support body, is displaceable with respect to the other support body in the direction of the optical axis, whereby a mounting body is positioned between both intermediary bodies, which mounting body has two parallel contact surfaces, on which the contact surfaces of the intermediary body are fitted in a displaceable manner, and between which a hollow space for the accommodation of optical elements is located. Thus, on both sides of the optical device provided in the mounting body, an adjustment of a light-conducting fiber both in the direction of the optical axis as well as in all directions perpendicular thereto is thereby possible.

In all cases, it is appropriate that the distance between the optical elements to be coupled is as small as possible, in order to not disadvantageously allow dispersions to appear in the transition area between the optical elements, unless additional optical elements, such as, for example, lenses or the like, are provided for the prevention of these disadvantages.

BRIEF DESCRIPTION OF THE DRAWINGS

The invention will now be illustrated in greater detail by means of the attached drawing.

FIGS. 1 to 3 depict, in exploded form, and:

FIG. 4 depicts, in assembled form, one embodiment of the device in accordance with the invention for the coupling of two light-conducting fibers;

FIGS. 5 to 9 depict, in exploded form, and:

FIG. 10 depicts, in assembled form, one embodiment of a device for the coupling of two light-conducting fibers with a hollow space positioned between the same for the accommodation of an optical element:

FIGS. 11 to 13 depict, in exploded form, and:

FIG. 14 depicts, in assembled form, one embodiment for the coupling of a light-conducting fiber with a laser, within a hollow space positioned between the two, for the placing of an optical element;

DETAILED DESCRIPTION OF THE PRESENT INVENTION

Figure 15:
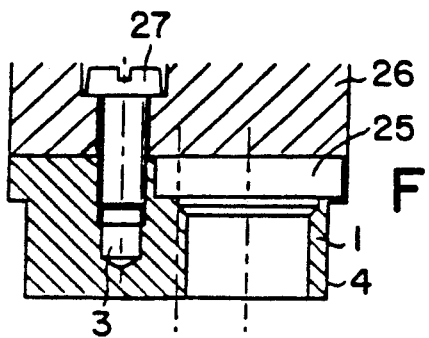
FIGS. 15 to 17 depict, in exploded form.
Figure 16:
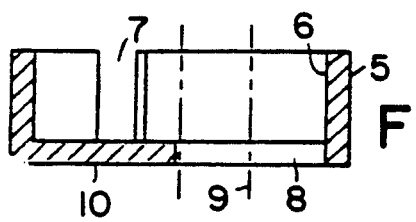
Figure 17:
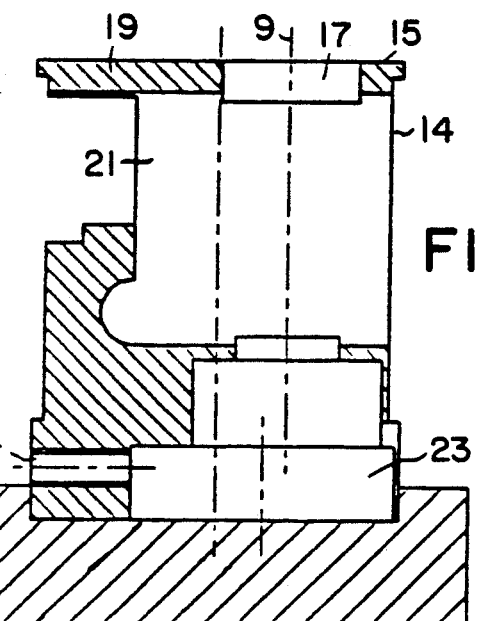

FIG. 1 depicts a support body (1), through which there extends a boring or hole (2) for the accommodation of a light-conducting fiber, not depicted, and in which there is located a threaded blind hole (3) for a screw for the application of mounting supports or the like. The support body (1) has a cylindrical external surface (4).

FIG. 2 depicts an intermediary body (5), the cylindrical internal surface (6) of which corresponds, with a narrow tolerance and its internal diameter, to the external diameter of the cylindrical external surface (4) of the support body (1), so that the support (1) can be slid into and moved within the intermediary body (5) in a telescoping manner. In the area of the internal surface (6), there are located openings (7) in order to provide accessibility from the outside to the external surface (4) of the support body (1) which has been moved in, in order to be able to later apply adhesive between the surfaces (4) and (6). Within the intermediary body (5), there is additionally provided on opening (8), in order to make possible the penetration of light along the optical axis (9) as indicated by the dotted line. Furthermore, the intermediary body (5) has a contact surface (10) for the fitting on a contact surface (11) of an additional support body (12), in which there is provided a boring (13) for the insertion of the end a light-conductive fiber, which is not depicted.

FIG. 4 depicts the parts depicted in FIGS. 1 to 3 in an assembled, adjusted position. The external surface (4) of support body (1) is positioned by axial movement within the cylindrical internal surface (6) of the intermediary body (5), the adjustment of support body (1) perpendicular to the optical axis (9) by means of a lateral displacement of the intermediary body (5) takes place in relation to the support body (12), whereby the contact surfaces (10 and 11) slide on one another. The fixing of the device is carried out through the application of a water adhesive, in the area between the contact surfaces (4 and 6) in the diagram, from the top and/or through the opening (7).

In the embodiment depicted in FIGS. 5 to 9 in exploded form, and in FIG. 10 in assembled form, some of the same parts are present as in the embodiment in accordance with FIGS. 1 to 4. The same parts are labelled with the same reference numbers. FIGS. 5 and 9 each depict, in opposite positions, the support parts (1). FIGS. 6 and 8 each depict, in opposite positions, the intermediary body (5). What is new here is a mounting body (14), which has two parallel contact surfaces (15 and 16) lying opposite to one another, for the contact surfaces (10) of both the intermediary bodies (5). The penetration of light along the optical axis (9) is permitted by openings (17 and 18) within the plate-shaped parts (19 and 20), between which a hollow space (21) is provided within the mounting body (14) for the accommodation of an optical element (22), to which the light guide may be coupled to the support bodies (1 and 2).

FIG. 10 depicts the parts in accordance with FIGS. 5 to 9 in assembled form. The orientation of the light-conducting fiber, which is located in the support body (1) depicted at the top of FIG. 10, takes place in the same manner as in the embodiment in accordance with FIG. 5, but in which, however, instead of the contact surface (11) of the support body (12), the contact surface (15) is operable. On the lower side, the base (16), on which the contact surface (10) of the lower intermediary body (5) is fitted in a displaceable manner, is correspondingly operative. The adjustment and fixing take place as in the example in accordance with FIGS. 1 to 4.

FIGS. 11 to 13 depict, in exploded form, and FIG. 14 depicts in assembled form, an embodiment which thoroughly corresponds to FIGS. 5 to 10. The same or corresponding parts are provided with the same reference figures. One difference consists of the fact, that the lower part of the mounting body (14) is constructed in a thicker manner, and is provided with an accommodation space (23) for a laser, a diode or the like, which is not depicted.

These optical elements can be firmly clamped in the mounting (23) with the aid of a clamping screw, which is now depicted, which can be screwed into a threaded hole (24).

Figure 18:
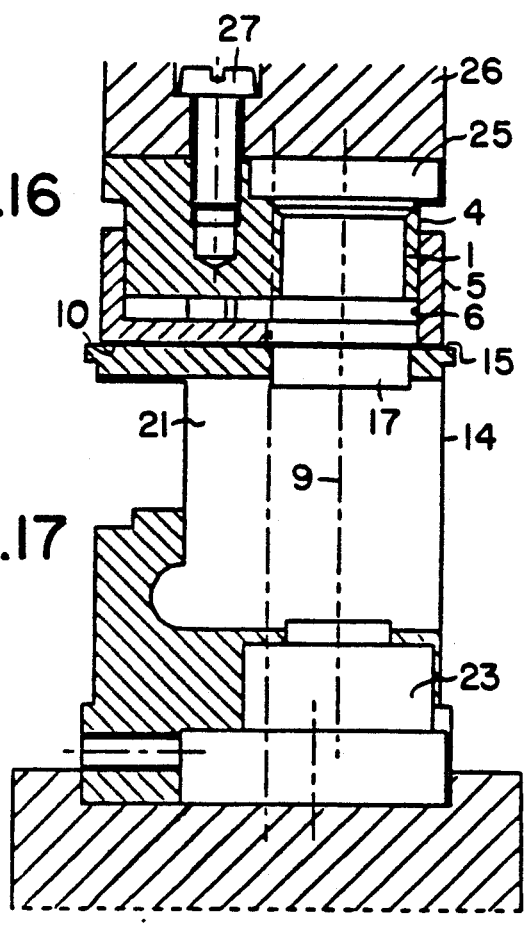
FIG. 18 depicts, in assembled form, one embodiment of a device for the coupling of a laser/and or diodes to an optical element.

The embodiment depicted in FIGS. 15 to 18 thoroughly corresponds to that in FIG. 14. The same or corresponding parts are provided with the same reference figures. One difference consists in the fact that, in the support body (1), a relatively small diameter a boring or hole (2) is not provided for a light guide, but, rather a mounting (25) is provided for the application of a laser diode, not depicted, which is fixed in the support body (1). In order to mount a support body (1) in an adjusting device (26), the parts are assembled as shown in FIGS. 15 and 18 and they are attached by means of a screw (27) which is screwed into the threaded blind hole (3) in support body (11).

While we have shown presently preferred embodiments of the present invention, it will be understood that modifications can be made without departing from the scope of the invention as defined in the appended claims.

I claim:

1. A device for the coupling of lasers, diodes or the like with one another or with light-conductive fibers or of such fibers or elements with one another, having two support bodies, each for holding a laser or a fiber in the direction of one optical axis, characterized in that, an intermediary body is positioned between the two support bodies with one of the two support bodies being guided in the direction of the optical axis and connected in a displaceable manner with said one of the two support bodies by means of sliding surfaces, said intermediary body having a contact surface extending perpendicularly to the optical axis and engaging on a surface likewise extending perpendicularly to the optical axis on the other of the two support bodies, said intermediary body contact surface being displaceable on said surface on the other of the two support bodies both rotationally and axially adjusted and means for retaining the parts in relationship.

2. A device in accordance with claim 1, characterized in that, the sliding surfaces are at least partially cylindrical said intermediary body and said one of said support bodies being arranged one within the other for axial telescoping movement.

3. A device in accordance with claim 1, characterized in that, the sliding surface on the one support body is an external surface, and the sliding surface on the intermediary body is an internal surface, said surfaces being complementary to one another.

4. A device in accordance with claim 3, characterized in that, the intermediary body has at least one off-center opening extending up to the external surface of the one support body.

5. A device in accordance with claim 4 characterized in that the axis of the off-center opening is parallel to the optical axis.

6. A device in accordance with claim 1, characterized in that, the support body for an optical fiber has a boring therethrough for the accommodation of said fiber.

7. A device in accordance with claim 1, characterized in that, the support body for a laser has, in the direction of the optical axis and in front of the laser, a hollow space for the mounting of an optical element.

8. A device in accordance with claim 7 characterized in that the optical element is an interferometer.

9. A device for the coupling of lasers, diodes or the like with one another or with light-conductive fibers or of such fibers or elements with one another, having two support bodies, each for holding a laser or a fiber in the direction of one optical axis, characterized in that, an intermediary body is positioned between the two support bodies with one of the two support bodies being guided in the direction of the optical axis and connected in a displaceable manner with said one of the two support bodies by means of sliding surfaces, said intermediary body having a contact surface extending perpendicularly to the optical axis and engaging on a surface likewise extending perpendicularly to the optical axis on the other of the two support bodies, said intermediary body contact surface being displaceable on said surface on the other of the two support bodies, and means for retaining the parts in assembled relationship, further characterized in that, a second intermediary body is provided said second intermediary body being coordinated with the other support body, and, in the same manner as the first intermediary body which is coordinated with the one support body is displaceable relative to the other support body in the direction of the optical axis; and a mounting body is positioned between both the first and second intermediary bodies, said mounting body having two contact surfaces parallel to one another and perpendicular to the optical axis, in contact surfaces of the intermediary bodies being applied to the contact surfaces of the mounting body in a displaceable manner, and a hollow space for the accommodation of an optical element being located in the mounting body.

10. A device as in claim 9 characterized in that means are provided for retaining the support bodies, intermediary bodies and mounting body in desired assembled relationship.

* * * * *